United States Patent
Kim et al.

(10) Patent No.: US 9,842,379 B2
(45) Date of Patent: Dec. 12, 2017

(54) METHOD AND APPARATUS FOR REGISTERING MEDICAL IMAGES

(71) Applicant: SAMSUNG ELECTRONICS CO., LTD., Suwon-si (KR)

(72) Inventors: Sunkwon Kim, Suwon-si (KR); Joonho Seo, Seoul (KR); Youngkyoo Hwang, Seoul (KR); Jungbae Kim, Seoul (KR); Youngtaek Oh, Seoul (KR); Wonchul Bang, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 139 days.

(21) Appl. No.: 14/736,914

(22) Filed: Jun. 11, 2015

(65) Prior Publication Data

US 2015/0371361 A1 Dec. 24, 2015

(30) Foreign Application Priority Data

Jun. 18, 2014 (KR) .................. 10-2014-0074506

(51) Int. Cl.
*G06K 9/00* (2006.01)
*G06T 3/00* (2006.01)
*G06T 7/33* (2017.01)

(52) U.S. Cl.
CPC .............. *G06T 3/0068* (2013.01); *G06T 7/33* (2017.01); *G06T 2207/10081* (2013.01); *G06T 2207/10088* (2013.01); *G06T 2207/10101* (2013.01); *G06T 2207/10132* (2013.01); *G06T 2207/30004* (2013.01)

(58) Field of Classification Search
None
See application file for complete search history.

(56) References Cited

U.S. PATENT DOCUMENTS

| 8,320,711 | B2 | 11/2012 | Altmann et al. |
| 8,355,775 | B2 | 1/2013 | Oshiki et al. |
| 9,131,922 | B2* | 9/2015 | Li ........................ A61B 8/5207 |
| 9,351,709 | B2* | 5/2016 | Hague .................. A61B 5/7425 |
| 9,563,959 | B2* | 2/2017 | Shim ....................... G06T 5/007 |
| 2010/0239150 | A1* | 9/2010 | Ishikawa .............. A61B 5/0095 382/131 |
| 2011/0028844 | A1 | 2/2011 | Hyun et al. |
| 2013/0185700 | A1* | 7/2013 | Avrahami ................. G06F 8/73 717/120 |
| 2015/0070469 | A1* | 3/2015 | Yoshibayashi .......... G06T 19/00 348/46 |

FOREIGN PATENT DOCUMENTS

| JP | 2006-296464 A | 11/2006 |
| KR | 10-2008-0053057 A | 6/2008 |
| KR | 10-2011-0013036 A | 2/2011 |
| KR | 10-1017610 B1 | 2/2011 |

* cited by examiner

*Primary Examiner* — Nancy Bitar
(74) *Attorney, Agent, or Firm* — Sughrue Mion, PLLC

(57) ABSTRACT

A method for registering medical images includes calculating, when a probe is disposed on a reference point of a target, a transformation relation for registering a first medical image and a second medical image having a different modality from the first medical image by using the reference point, wherein the first medical image is obtained by using the probe; and obtaining a sectional image of the second medical image corresponding to a sectional image of the first medical image from the second medical image by using the transformation relation.

13 Claims, 9 Drawing Sheets

METHOD AND APPARATUS FOR REGISTERING MEDICAL IMAGES

CROSS-REFERENCE TO RELATED APPLICATION

This application claims priority from Korean Patent Application No. 10-2014-0074506, filed on Jun. 18, 2014, in the Korean Intellectual Property Office, the disclosure of which is incorporated herein in its entirety by reference

BACKGROUND

1. Field

Apparatuses and methods consistent with exemplary embodiments relate to registering medical images of different modalities.

2. Description of the Related Art

With recent developments in medical technologies, high definition medical images may be obtained and also fine manipulation of medical equipment has become possible. Accordingly, a method of treating a patient by directly forming a small hole in the skin, inserting a catheter or a medical needle into the patient's body, and observing the interior regions by using medical imaging equipment has been developed. The method is referred to as a medical treatment method using an image or an interventional image medical treatment method.

Accordingly, a medical practitioner may identify the position of an organ or a lesion through an image. In addition, the medical practitioner recognizes a change according to the patient's breathing or moving during a medical treatment. Thus, the medical practitioner needs to accurately and quickly recognize the breathing or moving based on a real-time medical image. However, it is difficult to clearly identify the shapes of an organ and a lesion from a real-time medical image with the naked eye.

In contrast to an ultrasonic wave image, a magnetic resonance (MR) image or a computed tomography (CT) image may clearly distinguish an organ and a lesion. However, since an MR or CT image cannot be obtained in real-time during a medical treatment, the breathing and moving of a patient during the medical treatment cannot be detected in real-time in the MR or CT image.

Therefore, a real-time medical image and a medical image having a different modality from the real-time medical image need to be registered. A plurality of medical images of different modalities may be registered by obtaining features from the plurality of medical images, but it may be difficult to perform registration depending on image quality.

SUMMARY

Exemplary embodiments may address at least the above problems and/or disadvantages and other disadvantages not described above. Also, the exemplary embodiments are not required to overcome the disadvantages described above, and may not overcome any of the problems described above.

One or more exemplary embodiments provide methods and apparatuses for registering a plurality of medical images of different modalities by using a sensor.

According to an aspect of an exemplary embodiment, a method of registering medical images includes calculating, when a probe is disposed on a reference point of a target, a transformation relation for registering a first medical image and a second medical image having a different modality from the first medical image by using the reference point, the first medical image is obtained by using the probe; and obtaining a sectional image of the second medical image corresponding to a sectional image of the first medical image from the second medical image by using the transformation relation.

The reference point may be an object in the target, which is not modified over time.

The object may be a bone.

The calculating may include calculating a transformation relation between coordinates of the first medical image and coordinates of the second medical image by using the reference point.

The method may further include supplementing the transformation relation by aligning a first object included in the first medical image and a second object included in the second medical image.

When the first and second objects are the same, the first and second objects may be matched.

When the first and second objects are different, a geometric disposition structure between the first and second objects may be matched with a pre-stored geometric disposition structure.

When the probe is disposed on the reference point of the target, an axis of the probe may be parallel to an axis of the target.

The axis of the target may be parallel to a coordinate axis of the second medical image.

The obtaining may include obtaining coordinates of the sectional image of the first medical image; transforming the coordinates into coordinates of the second medical image by using the transformation relation; and obtaining a sectional image having the transformed coordinates from the second medical image.

Coordinates of the sectional image of the first medical image may correspond to a position and an orientation of the probe.

The first medical image may be captured in real-time and the second medical image may be captured in advance.

The first medical image may be any one selected from an ultrasound image and an optical coherence tomography image. The second medical image may be any one selected from a magnetic resonance image, a computed tomography image, a positron emission tomography image, a single photon emission computed tomography image, and an X-ray image.

The method may further include displaying the sectional image of the second medical image with the sectional image of the first medical image.

According to another aspect of an exemplary embodiment, a medical image apparatus includes an interface receiving at least one selected from a position and an orientation of a probe obtaining a first medical image; and a processor calculating, when a probe is disposed on a reference point of a target, a transformation relation for registering a first medical image and a second medical image having a different modality from the first medical image by using the reference point.

The reference point may be an object in the target, which is not modified over time.

The transformation relation may be supplemented by aligning a first object included in the first medical image and a second object included in the second medical image.

When the probe is disposed on the reference point of the target, an axis of the probe may be parallel to an axis of the target.

The medical image apparatus may further include a detector detecting at least one selected from the position and the orientation of the probe.

BRIEF DESCRIPTION OF THE DRAWINGS

The above and/or other aspects will become more apparent by describing certain exemplary embodiments with reference to the accompanying drawings, in which.

DETAILED DESCRIPTION

Figure 1:
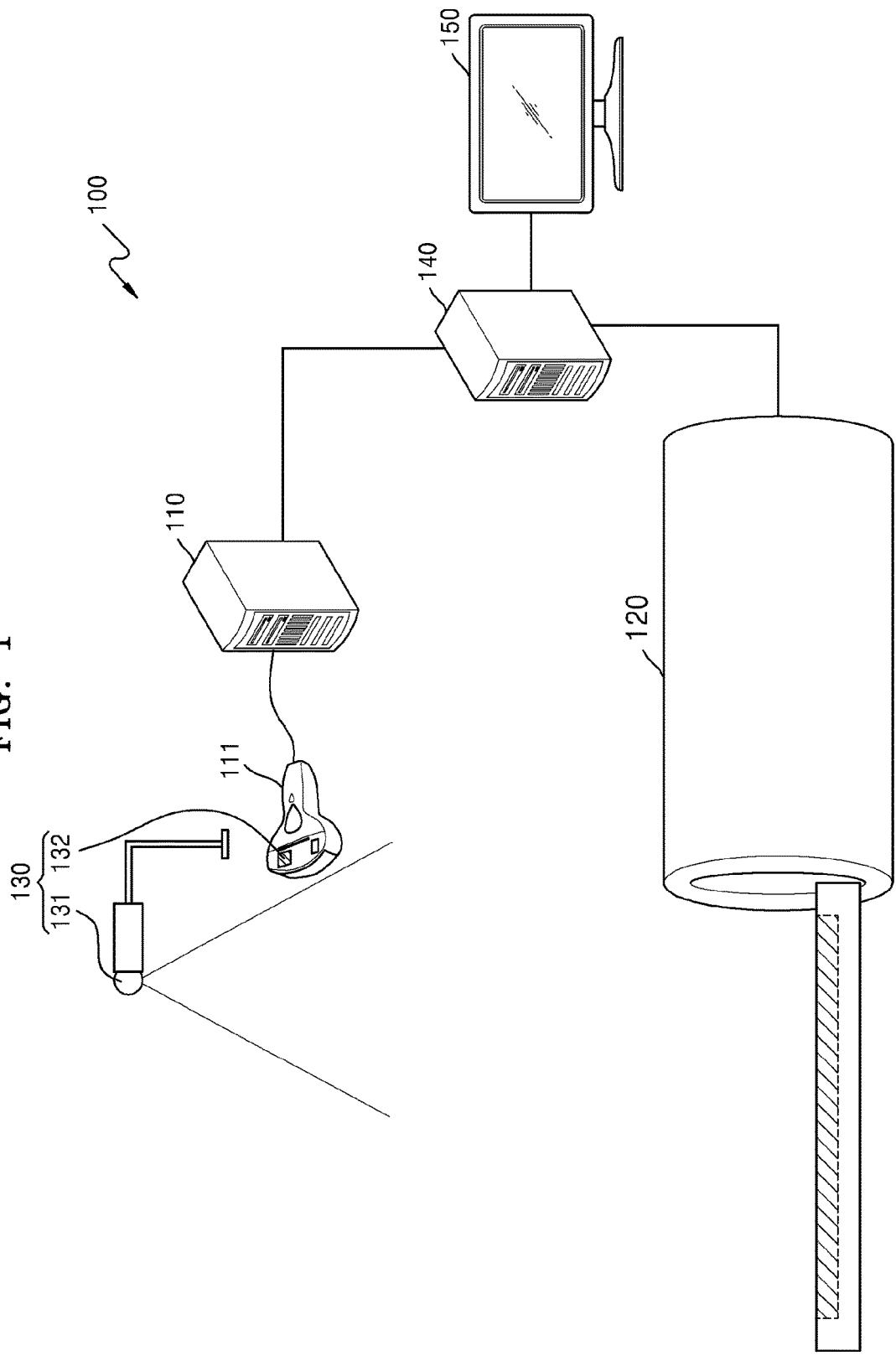
FIG. 1 is a diagram of a medical image system according to an exemplary embodiment.

Certain exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list.

Throughout the specification, a target or an object may include a human, an animal, or a part of a human or animal. Furthermore, throughout the specification, the a user" may be, but is not limited to, a medical expert, e.g., a medical doctor, a nurse, a medical laboratory technologist, a medical image expert, and a technician who repairs a medical apparatus.

FIG. 1 is a diagram of a medical image system 100 according to an exemplary embodiment. Referring to FIG. 1, the medical image system 100 includes a first medical apparatus 110, a second medical apparatus 120, a detector 130, a registering apparatus 140, and a display apparatus 150.

The first and second medical apparatuses 110 and 120 respectively generate a first medical image and a second medical image and transmit the first and second medical images to the registering apparatus 140. The first and second medical images have different modalities. In other words, the first and second medical images may be different in terms of generation methods and principles. The registering apparatus 140 obtains and registers the first and second medical images. An image registered by the registering apparatus 140 may be displayed on the display apparatus 150.

The first medical apparatus 110 generates a first medical image regarding a volume of interest (VOI) of a target in real-time. For example, when there is a modification or a displacement of an organ due to physical activities of the target, the changes may appear on the first medical image in real-time. However, since not all of the organs and lesions can be clearly observed on the first medical image, it may be difficult to detect the modification and the displacement of the organ by only using the first medical image.

According to an exemplary embodiment, the first medical apparatus 110 may be an ultrasonography machine that generates images during interventional medical operations in real-time. Alternatively, the first medical apparatus 110 may be other medical apparatuses such as an optical coherence tomography (OCT) that generates images in real-time. However, the first medical apparatus 110 is not limited thereto.

When the first medical apparatus 110 is an ultrasonography machine, the first medical apparatus 110 generates ultrasound images by radiating ultrasound waves on the target by using a probe 111 and detecting ultrasound echo waves. The probe 111 includes a piezoelectric transducer, but is not limited thereto. The probe 111 may include a capacitive micro-machined ultrasonic transducer (cMUT) that transforms an ultrasound signal into an electric signal and vice versa by changing capacitance, a magnetic micro-machined ultrasonic transducer (mMUT) that transforms an ultrasound signal into an electric signal and vice versa by changing magnetic fields, or an optical ultrasonic detector that transforms an ultrasound signal into an electric signal and vice versa by changing optical properties.

When ultrasound waves of several to hundreds of MHz are transmitted from the probe 111 to a certain region in the body of a patient, the ultrasound waves are partially reflected from layers between various tissues. The ultrasound wave is reflected from objects which have a density change in the body, e.g., blood cells in blood plasma and small structures in organs.

The ultrasound echo waves cause vibration in a transducer of the probe 111, and the transducer outputs electrical pulses in response to the vibration. The electrical pulses are transformed into images. When objects have different ultrasound wave reflection characteristics, each object may have different brightness values in a B-mode ultrasound image.

The second medical apparatus 120 generates a second medical image regarding the VOI of the target in non-real time. Due to the non-real time characteristics of the second medical apparatus 120, the second medical image may be an image generated before a medical operation.

For example, the second medical apparatus 120 may be one of a computed tomography (CT) imaging apparatus, a magnetic resonance (imaging (MRI) apparatus, an X-ray imaging apparatus, a single photon emission computed tomography (SPECT) imaging apparatus, and a positron emission tomography (PET) imaging apparatus. Hereinafter, for convenience of description, it is assumed that the second medical image is an MR image or a CT image. However, the exemplary embodiments are not limited thereto.

In a CT image or an MR image generated by the second medical apparatus 120, a location of an organ or a lesion may be clearly identified. However, an organ may be modified or displaced when a patient breathes or moves during a surgical operation, and the CT image or the MR image might not reflect the modification or displacement of the organ caused by the movement of the patient in real-time.

The second medical apparatus 120 might not output images in real-time because the CT image is captured by using radiation, and thus it is recommended to perform tomography for a short time in order to prevent a patient and an operator from being exposed to radioactivity for a long time and because it takes a long time to capture the MR image. The CT image is captured in a state where a patient temporarily stops breathing, for example, in a state of maximum inhalation.

Medical images captured by the first medical apparatus 110 or the second medical apparatus 120 may be two-dimensional (2D) sectional images or three-dimensional (3D) images generated by accumulating 2D sectional images. For example, the first medical apparatus 110 may generate 2D sectional images, or generate 3D images, by shaking or sweeping the probe 111 with the hand or by using a 2D array-type probe 111.

The second medical apparatus 120 captures a plurality of sectional images by changing a position or an orientation of the target or the second medical apparatus 120. When the sectional images are accumulated, 3D volume image data that represents a certain region of the patient in 3D may be generated. A method of generating 3D volume image data by accumulating sectional images is referred to as a multi-planar reconstruction (MPR) method. The second medical image may be an image with enhanced contrast in order to increase the brightness of an organ of interest of the patient. Hereinafter, for convenience of description, a medical image may be a 2D image or a 3D image, and a 2D medical image is referred to as a sectional image.

The detector 130 may detect movements of the probe 111 by detecting at least one of a position and an orientation of the probe 111. The detector 130 may include a magnetic field generator 131 and a sensor 132 that senses changes of a magnetic field. The magnetic field generator 131 may be fixed at a certain location of the first medical apparatus 110, and the sensor 132 may be disposed on the probe 111. Accordingly, the detector 130 may detect at least one of the position and the orientation of the probe 111 based on a relative location of the magnetic field generator 131 with respect to the sensor 132. Or, the detector 130 may include an optical sensor, an accelerometer sensor, and an inclination sensor to detect at least one selected from the position and the orientation of the probe 111. The detector 130 may output at least one of the position and the orientation of the probe 111 as coordinates of the detector 130 in a coordinate system.

The registering apparatus 140 registers the first medical image obtained from the first medical apparatus 110 and the second medical image obtained from the second medical apparatus 120. The registration of the medical images may include a process of mapping respective coordinate systems of the first and second medical images. A sectional image of the first medical image corresponds one-to-one with the position and the orientation of the probe 111. Therefore, when the probe 111 is disposed at a certain position and in a certain orientation, a system according to an exemplary embodiment calculates a transformation relation for registering the first and second medical images. Also, according to an exemplary embodiment, the registration of medical images may be performed by using at least one of the position and the orientation of the probe 111 and coordinates of objects included in the first and second medical images.

According to an exemplary embodiment, a registered image may be a fusion image generated by fusing the first and second medical images. According to another exemplary embodiment, a registered image may be an image obtained by aligning first and second medical images captured at a same viewpoint such that they are alongside each other. The registered image may be displayed by the display apparatus 150.

For convenience of description, in an exemplary embodiment illustrated in FIG. 1, the first medical apparatus 110, the detector 130, the registering apparatus 140, and the display apparatus 150 are independent apparatuses. However, the first medical apparatus 110, the detector 130, and the display apparatus 150 may be formed as a single apparatus.

A transformation relation between the respective coordinate systems of the first and second medical images may be used for obtaining a sectional image of the second medical image that corresponds to the sectional image of the first medical image. In order to easily obtain the transformation relation, at least one of the position and the orientation of the probe 111 may be used, since the sectional image of the first medical image corresponds one-to-one with the position and the orientation of the probe 111.

Figure 2:
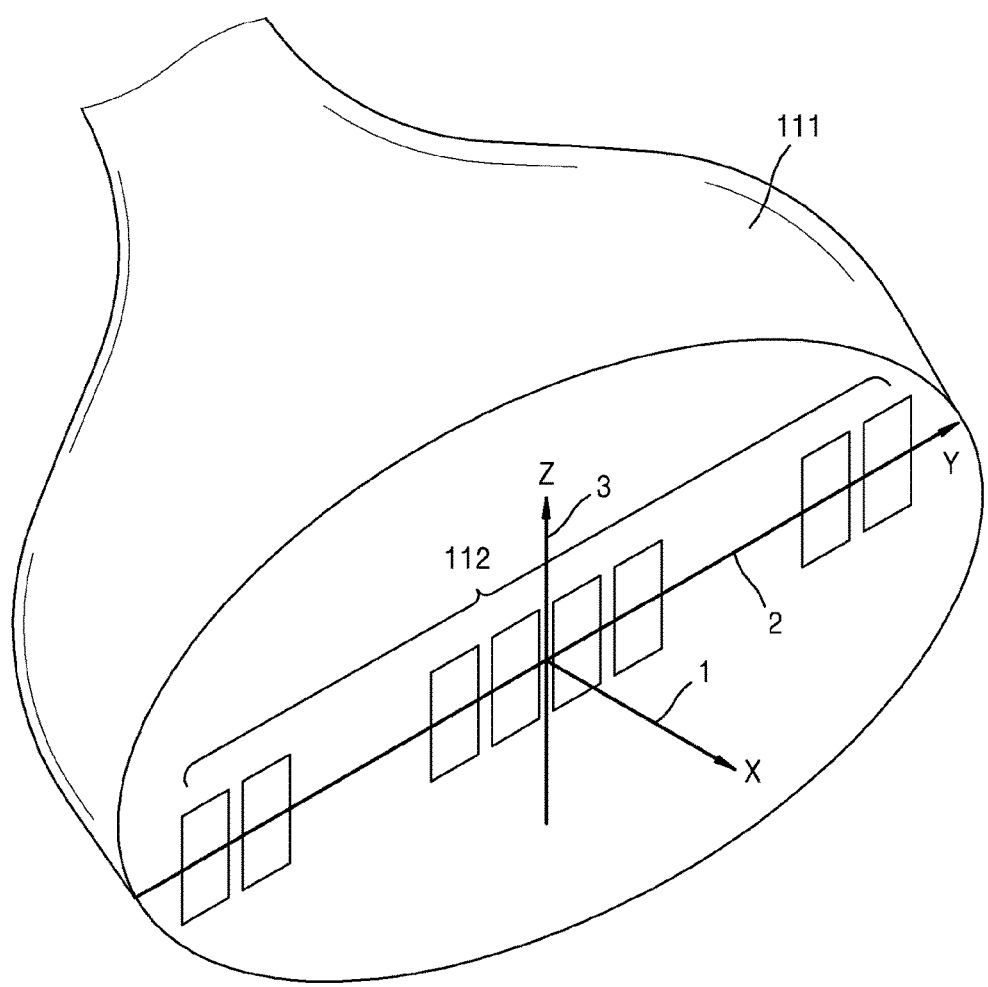
FIG. 2 is a diagram for describing axes of a probe, according to an exemplary embodiment.

FIG. 2 is a diagram for describing the axes of a probe, according to an exemplary embodiment. As illustrated in FIG. 2, with respect to a transducer 112 of the probe 111, the axes of the probe 111 include a first axis 1, i.e., an axial direction X that is a proceeding direction of transmission waves; a second axis 2, i.e. a lateral direction Y that is a width direction of the transducer 112; and a third axis 3, i.e., an elevation direction Z that is a height direction of the transducer 112. The center of the probe 111 indicates the center of the transducer 112, and the position of the probe 111 may indicate a position of the center of the probe 111.

Figure 3:
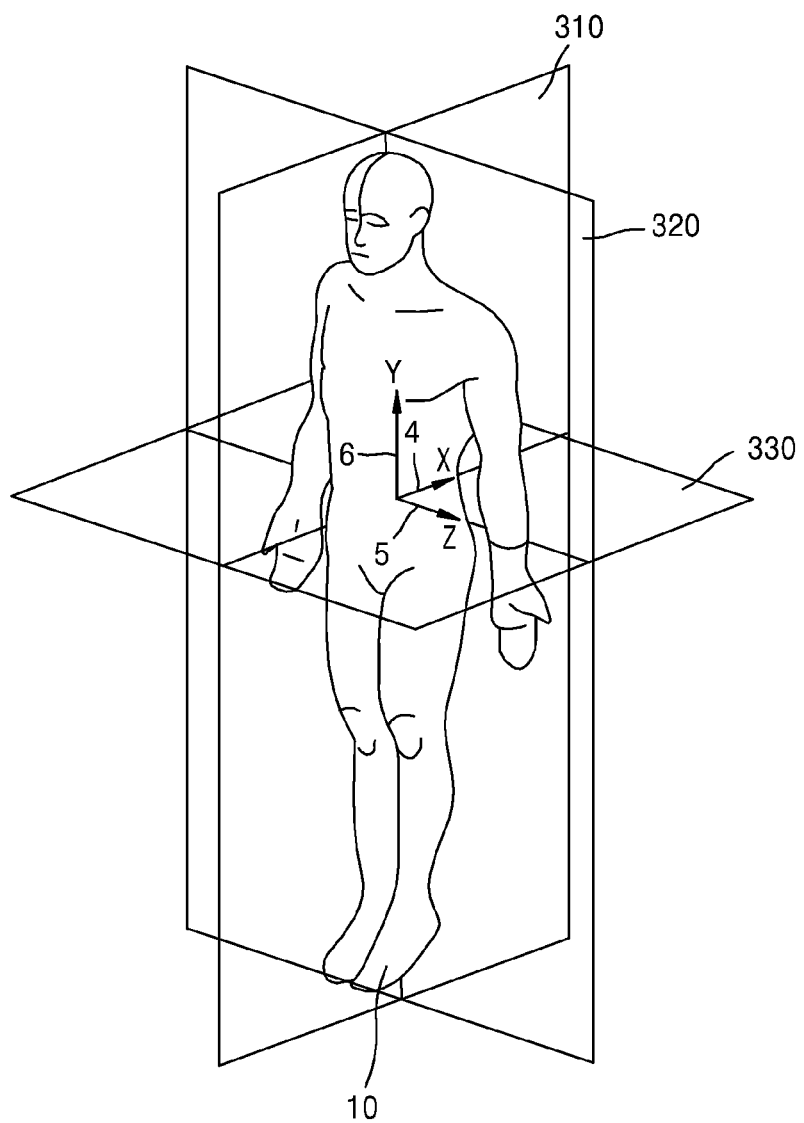
FIG. 3 is a diagram for describing axes of a target, according to an exemplary embodiment.

FIG. 3 is a diagram for describing axes of the target, according to an exemplary embodiment. As illustrated in FIG. 3, planes that cross the target may include a sagittal plane 310, a coronal plane 320, and a transverse plane 330. A fourth axis 4 is where the sagittal plane 310 intersects with the transverse plane 330, a fifth axis 5 is where the sagittal plane 310 intersects with the coronal plane 320, and a sixth axis 6 is where the coronal plane 320 intersects with the transverse plane 330.

In order to obtain the transformation relation between the respective coordinate systems of the first and second medical images, the probe 111 may be disposed on a reference point of the target. The reference point may be at least one of the objects of the target. The reference point may be an object that may be easily identified in the first medical image and not modified over time. For example, the reference point may be a bone. A user may dispose the probe 111 on the reference point of the target.

Figure 4:
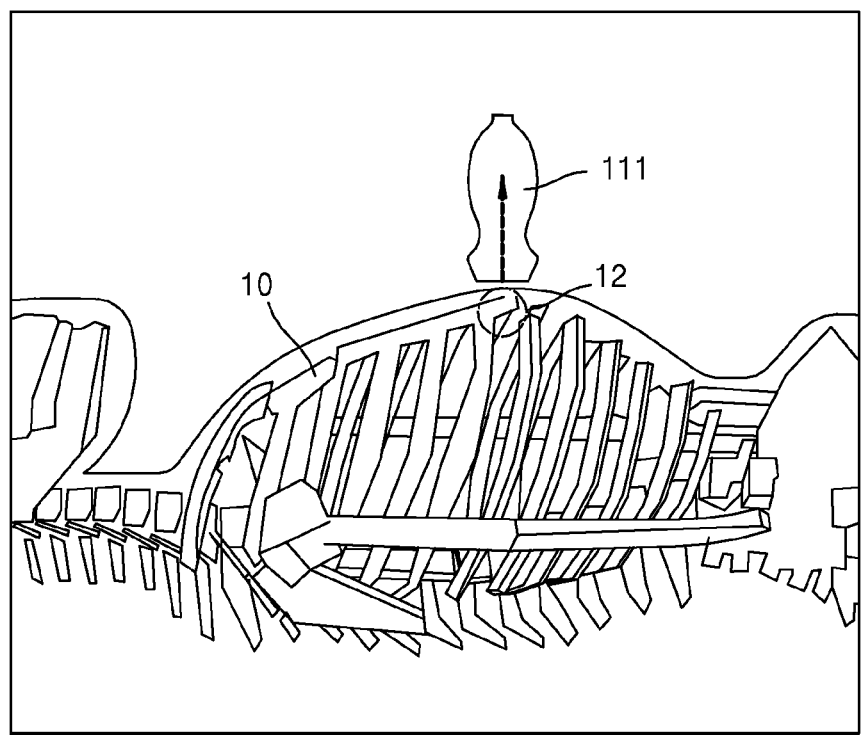
FIG. 4 is a diagram for describing a probe disposed on a target, according to an exemplary embodiment.

FIG. 4 is a diagram for describing the probe 111 disposed on a target 10, according to an exemplary embodiment. As illustrated in FIG. 4, the user may dispose the probe 111 on a celiac plexus which may be the reference point 12 of the target 10. Furthermore, the user may dispose an axis of the probe 111, e.g., the first axis 1, to be in parallel to an axis of the target 10, e.g., the fourth axis 4.

When the probe 111 is disposed on the reference point 12 of the target 10, the registering apparatus 140 may obtain coordinates of the reference point 12 from the first medical image obtained by the probe 111. The coordinates of the reference point 12 is based on the coordinate system of the first medical image. Alternatively, the registering apparatus 140 may obtain the coordinates of the reference point 12 from the second medical image. In this case, the coordinates of the reference point 12 is based on the coordinate system of the second medical image. Accordingly, the transformation relation between the respective coordinate systems of the first and second images may be obtained by calculating a transformation relation between the coordinates of the reference point 12 based on the coordinate system of the first medical image and the coordinates of the reference point 12 based on the coordinate system of the second medical image.

Figure 5:
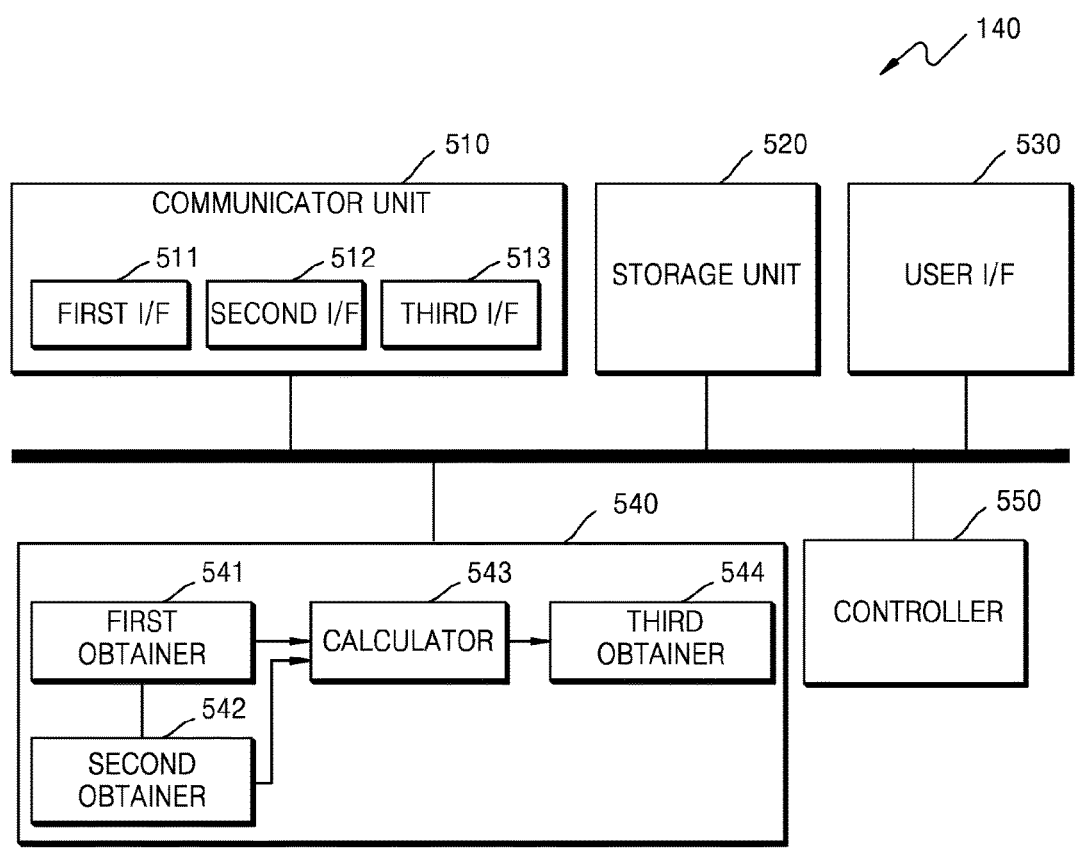
FIG. 5 is a block diagram of a registering apparatus of FIG. 1.

FIG. 5 is a block diagram of the registering apparatus 140 of FIG. 1. Referring to FIG. 5, the registering apparatus 140 may include a communicator 510, a storage unit 520, a user interface (I/F) 530, a processor 540, and a controller 550. However, the illustrated elements are not essential, and other general-use elements may be included in the registering apparatus 140.

The communicator 510 respectively receives the first and second medical images from the first and second medical apparatuses 110 and 120, and may receive at least one of the position and the orientation of the probe 111 from the detector 130. The communicator 510 includes a first I/F 511, a second I/F 512, and a third I/F 513 for obtaining the first and second medical images from the first and second medical apparatuses 110 and 120. The first I/F 511 and the second I/F 512 are directly or indirectly connected to the first and second medical apparatuses 110 and 120, respectively.

The first I/F 511 may obtain the first medical image captured by the first medical apparatus 110 in real-time. The second I/F 512 may be directly connected to the second medical apparatus 120 in order to obtain the second medical image that was captured by the second medical apparatus 120 before a medical operation. Alternatively, the second I/F 512 may obtain the second medical image via other external storages media (USB, CD, DVD, etc.) or a network. The communicator 510 may store the obtained second medical image in the storage unit 520. The third I/F 513 may receive coordinates of the probe 111 from the detector 130. The coordinates of the probe 111 may correspond one-to-one with a sectional image of the first medical image received from the first I/F 511. Although it is described that the first medical image and the coordinates of the probe 111 are received by different interfaces, i.e., the first and third interfaces 511 and 513, the exemplary embodiments are not limited thereto. A single interface may receive both the first medical image and the coordinates of the probe 111.

The user I/F 530 receives an input for manipulating the registering apparatus 140 from the user and outputs the first medical image, the second medical image, and/or a registered medical image obtained by the registering apparatus 140. The user I/F 530 may include at least one of a button, a keypad, a switch, a dial, or a touch interface so that the user may manipulate the registering apparatus 140. The user I/F 530 may include a display for displaying images which may be formed as a touch screen. According to another exemplary embodiment, the user I/F 530 may include an input/output (I/O) port for connecting human interface devices (HIDs). The user I/F 530 may include an I/O port for input and output of images.

The processor 540 may register the first medical image and the second medical image corresponding to the first medical image, and thus output a registered image via the user I/F 530. The processor 540 may include a first obtainer 541 that obtains an object for registration from the first medical image, a second obtainer 542 that obtains an object for registration from the second medical image, a calculator 543 that calculates a transformation relation between the first and second medical images by aligning the obtained objects, and a third obtainer 544 that obtains a sectional image corresponding to a sectional image of the first medical image from the second medical image. The objects obtained by the first and second obtainers 541 and 542 may be the same or different. Depending on whether the objects are the same or not, a different method may be used to calculate the transformation relation.

The first obtainer 541 may obtain an object from the first medical image. The object may be a reference point of a target or an object other than the reference point which is clearly shown in the first medical image. For example, when the first medical image is an ultrasound image including a liver, the object may be the liver, the inferior vena cava (IVC), or a diaphragm disposed near the liver. Furthermore, the object may be at least one of a kidney, a gall bladder, portal veins, hepatic veins, and the IVC.

The second obtainer 542 may obtain an object from the second medical image. The object may be a reference point of a target or an object other than the reference point which is clearly shown in the second medical image. The object obtained by the second obtainer 542 may be the same as or different from the object obtained by the first obtainer 541. For example, when an organ of interest is a liver, in general, a diaphragm and IVC may both clearly appear in both the first medical image that is an ultrasound image and the second medical image that is an MR image. Therefore, the first and second obtainers 541 and 542 may respectively obtain the diaphragm or the IVC as objects. However, the exemplary embodiments are not limited thereto. Hereinafter, for convenience of description, an object obtained by the first obtainer 541, other than the reference point 12, is referred to as a "first object" and an object obtained by the second obtainer 542, other than the reference point 12, is referred to as a "second object." The second obtainer 542 may obtain the second object that is different from the first object and disposed near the first object. For example, when the first object is a diaphragm, the second object may be a liver. In this case, although the liver and the diaphragm are not the same objects, when the diaphragm is considered as an interface of the liver since the interface of the liver contacts the diaphragm, medical images may be registered by aligning the diaphragm and the liver.

The calculator 543 may calculate the transformation relation between the first and second medical images by matching the reference point in the first medical image and the reference point in the second medical image and supplement the transformation relation by aligning the first and second objects. When the first and second objects are the same, the calculator 543 may supplement the transformation relation by matching the first and second objects. However, when the first and second objects are different, the calculator 543 may match a geometric disposition structure between the first and second objects with a pre-stored geometric disposition structure so as to supplement the transformation relation. The geometric disposition structure between the first and second objects may be stored in advance.

As described above, calculating the transformation relation between the respective coordinate systems of the first and second medical images by using the reference points may be easier than calculating the transformation relation therebetween based on a random point.

When coordinates of the reference points of the first and second medical images are clear, the transformation relation between the first and second medical images may be calculated by only using the transformation relation between coordinates of the reference point in the first medical image and coordinates of the reference point in the second medical image. However, depending on the ability of the user, the probe 111 may be located on or slightly displaced from the reference points. Therefore, the registering apparatus 140 according to an exemplary embodiment supplements the transformation relation by using an object in the target other than the reference points.

The third obtainer 544 may obtain the sectional image of the second medical image corresponding to the sectional image of the first medical image from the second medical image. For example, the third obtainer 544 may transform coordinates of the sectional image of the first medical image into coordinates of the coordinate system of the second medical image by using the transformation relation and obtain a sectional image of the second medical image having transformed coordinates from the second medical image.

The respective sectional images of the first and second medical images are transferred to the display apparatus 150 or the user I/F 530, and thus the respective sectional images of the first and second medical images may be displayed at the same time. Each of the respective sectional images of the first and second medical images may be displayed in different areas, or after being combined into a single image.

The controller 550 controls operations of the registering apparatus 140. For example, the controller 550 may control the registering apparatus 140 such that the processor 540 generates an image by using a user command input via the user I/F 530 or a program stored in the storage unit 520. Also, the controller 550 may control the registering apparatus 140 such that the image generated by the processor 540 is displayed in the user I/F 530 or the display apparatus 150.

Details of the operations of the registering apparatus 140 will be described with reference to a method of registering medical images which will be described below. In the following description, even when there is no specific description, one of ordinary skill in the art may understand which component of the registering apparatus 140 performs a process corresponding to the component based on the description above.

Figure 6:
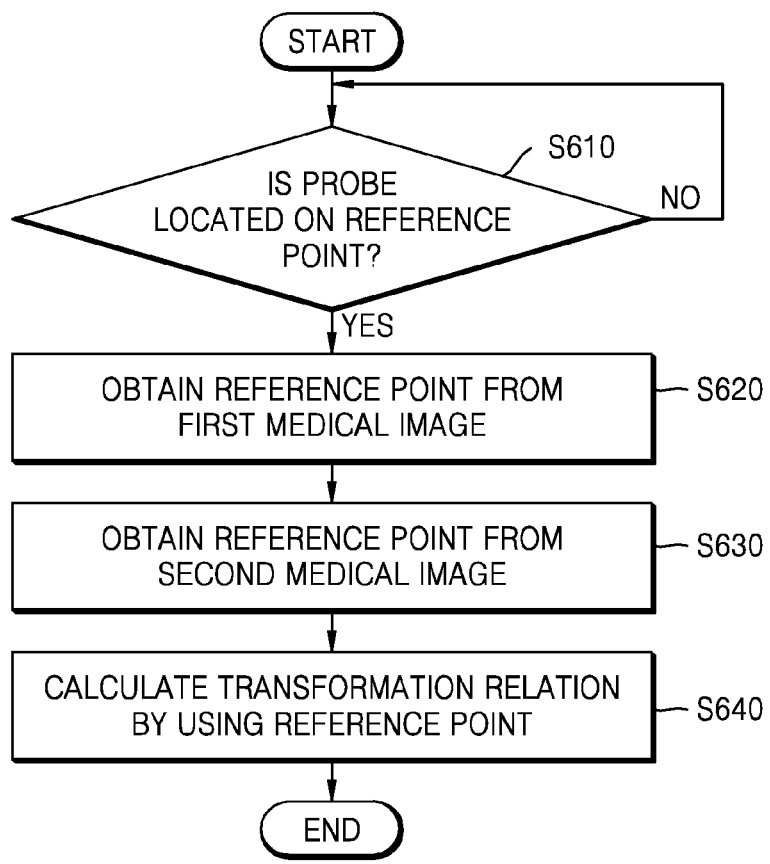
FIG. 6 is a flowchart of a method of registering medical images, according to an exemplary embodiment.

FIG. 6 is a flowchart of a method of registering medical images, according to an exemplary embodiment. Referring to FIG. 6, the controller 550 determines whether the probe 111 is disposed on the reference point 12 of the target (operation S610). The user may dispose the probe 111 on the reference point 12 of the target and input a user command informing that the probe 111 is disposed on the reference point 12 of the target. Then, the controller 550 may determine that the probe 111 is disposed on the reference point 12. Here, the reference point 12 may be an object that is not modified due to an external force. For example, the reference point 12 may be a certain bone of the target. When the probe 111 is disposed on the reference point 12 of the target, the controller 550 may match a coordinate system of the detector 130 with the coordinate system of the first medical image.

If the probe 111 is disposed on the reference point 12 of the target (operation S610-Y), the first obtainer 541 may obtain the reference point 12 from the first medical image and the coordinates of the reference point 12 from the coordinate system of the first medical image (operation S620).

For example, the first medical apparatus 110 may obtain the sectional image of the first medical image via the probe 111 in real-time and reconfigure the sectional image of the first medical image to generate the first medical image in 3D. The first medical apparatus 110 transfers the 3D first medical image to the registering apparatus 140, and the first obtainer 541 of the registering apparatus 140 may obtain the reference point 12 from the first medical image. The first obtainer 541 may use a brightness value to obtain the reference point 12, but is not limited thereto, and may use other methods to obtain the reference point 12.

The second obtainer 542 may obtain the reference point 12 from the second medical image and obtain the coordinates of the reference point 12 from the coordinate system of the second medical image (operation S630). The reference point 12 might not be clearly shown on the second medical image. In this case, the second obtainer 542 may use pre-stored information regarding the reference point 12 to predict the coordinates of the reference point 12 from the coordinate system of the second medical image. Although for convenience of description, it is described that the second obtainer 542 obtains the reference point from the second medical image after the first obtainer 541 obtains the reference point from the first medical image, the obtaining may be performed in an opposite sequence or at the same time.

The calculator 543 may match the respective reference points 12 of the first and second medical images and thus calculate the transformation relation between the respective coordinate systems of the first and second medical images (operation S640). The transformation relation may satisfy Equation 1.

$$T = x_{MR,0} x_{US,0}^{-1} \qquad \text{[Equation 1]}$$

where $x_{US,0}$ is the coordinates of the reference point 12 in the coordinate system of the first medical image, and $x_{MR,0}$ is the coordinates of the reference point 12 in the coordinate system of the second medical image.

Even when the probe 111 is disposed on the reference point 12, the center of the probe 111 may be imprecisely located at the center of the reference point 12, depending on the ability of the user. Also, in some cases, information regarding the reference point 12 might not be clearly included in the first medical image obtained by the probe 111 in real-time. Furthermore, when information regarding the reference point 12 is not clearly included in the second medical image, it may be difficult to exactly calculate the transformation relation between the first and second medical images by only using the reference point 12. Therefore, the registering apparatus 140 according to an exemplary embodiment may supplement the transformation relation by using another object in the target other than the reference point 12.

Figure 7:
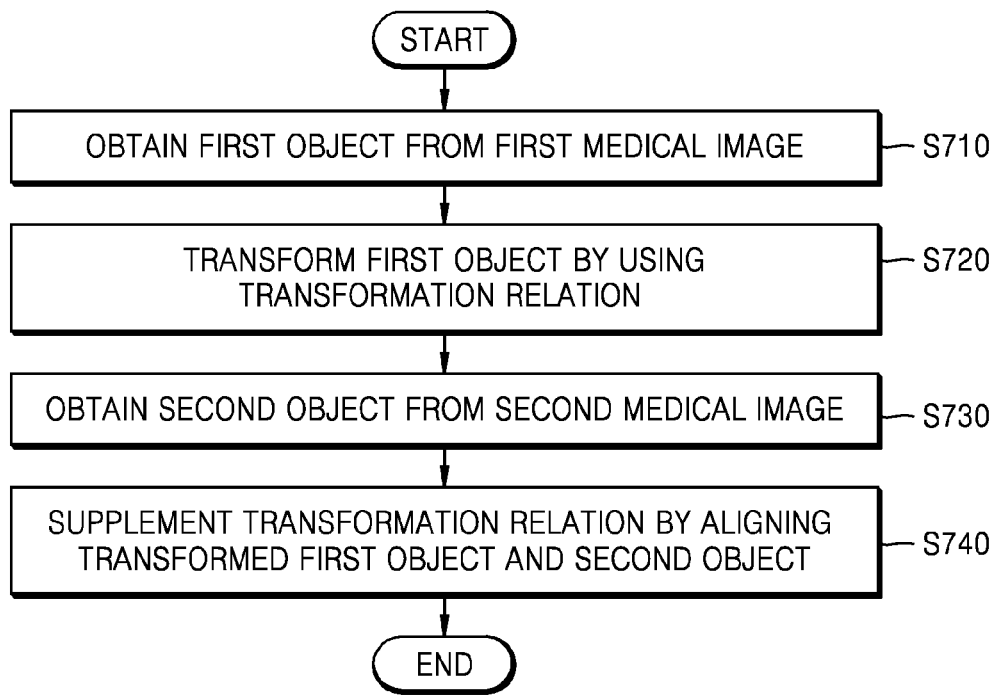
FIG. 7 is a flowchart of a method of supplementing a transformation relation, according to an exemplary embodiment.

FIG. 7 is a flowchart of a method of supplementing a transformation relation, according to an exemplary embodiment. Referring to FIG. 7, the first obtainer 541 obtains the first object from the first medical image, and coordinates of the first object (operation S710). The calculator 543 transforms the coordinates of the first object into coordinates of the coordinate system of the second medical image by using the transformation relation (operation S720).

The second obtainer 542 obtains the second object from the second medical image and coordinates of the second object (operation S730). The first and second objects may be objects that are clearly displayed in the first and second medical images, respectively. The first and second objects may be the same or different. Since general technology for obtaining an object in a medical image may be used as a method of obtaining the object in the exemplary embodiments, detailed description thereof will be omitted. The second obtainer 542 may obtain and store the second object from the second medical image in advance. Therefore, the second obtainer 542 may load the pre-stored second object. Operations S710 and S730 may be performed in the opposite order or at the same time.

The calculator 543 may supplement the transformation relation between the coordinate system of the first medical image and the coordinate system of the second medical image by aligning a transformed first object and the second object and thus obtain a final transformation relation $T_f$ (operation S740). The final transformation relation $T_f$ may be calculated by using Equation 2.

$$T_f = T_s T = x_{MR,2} x_{US,1}^{-1} \quad \text{[Equation 2]}$$

where $x_{US,1}$ is the coordinates of the first object in the coordinate system of the first medical image, $x_{MR,2}$ is the coordinates of the second object in the coordinate system of the second medical image, T is the transformation relation obtained by using the reference point, and $T_s$ is a supplement relation obtained by using the transformed first object and the second object.

Figure 8:
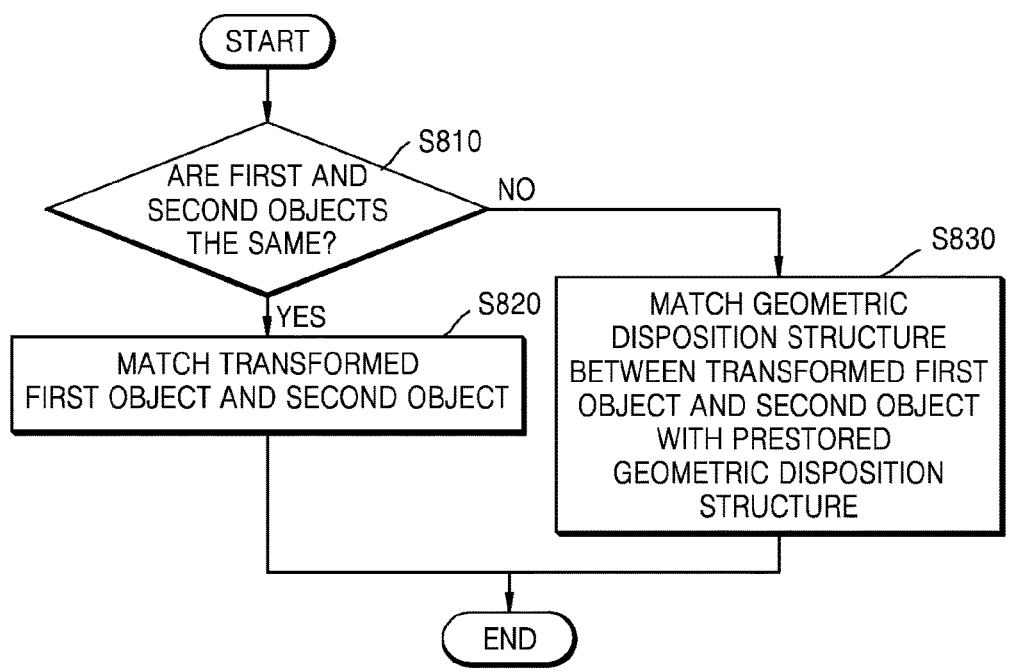
FIG. 8 is a flowchart of a method of aligning first and second objects, according to an exemplary embodiment.

A method of aligning the first and second objects may differ depending on whether the first and second objects are the same. FIG. 8 is a flowchart of a method of aligning first and second objects, according to an exemplary embodiment. First, the calculator 543 determines whether the first and second objects are the same (operation S810). The calculator 543 may determine whether the first and second objects are the same according to respective sizes, radii, etc., of the first and second objects. Alternatively, since the second object may be obtained and stored in advance, the second obtainer 542 may load information regarding the second object and obtain a first object that is the same as the second object by using the loaded information. In this case, the calculator 543 may determine that the first and second objects are the same. On the other hand, since different objects may be clearly displayed in the first and second medical images, respective pieces of information regarding first and second objects to be obtained may be stored in the registering apparatus 140. When the first and second objects are different, the registering apparatus 140 may have stored information regarding a geometric disposition structure between the first and second objects in advance.

If the first and second objects are the same (operation S810-Y), the calculator 543 may align the transformed first object and the second object by matching the transformed first object and the second object (operation S820).

If the first and second objects are different (operation S810-N), the calculator 543 may align the first and second objects such that a geometric disposition structure between the transformed first object and the second object corresponds to a pre-stored geometric disposition structure (operation S830). As described above, the reference points 12 are matched, the transformation relation between the first and second medical images is calculated, and furthermore, the first and second objects are used to supplement the transformation relation. Therefore, errors during a registering process may be reduced than when simply aligning the first and second objects.

In addition, when the probe 111 is disposed on the reference point 12 and the axis of the probe 111 is disposed such that the axis is parallel to an axis of the target, it is relatively easier to calculate the transformation relation between the first and second medical images. Since a coordinate axis of the second medical image is parallel to the axis of the target, a process of matching the reference points may be simplified.

As described above, the reference point is an object that is different from the first object or the second object, the transformation relation is calculated by using the reference point, and the transformation relation is supplemented by using another object. However, the exemplary embodiments are not limited thereto. The reference point may be the first object or the second object. Therefore, when the probe 111 is disposed on the first object or the second object, the transformation relation may be calculated by using the first and second objects.

Figure 9:
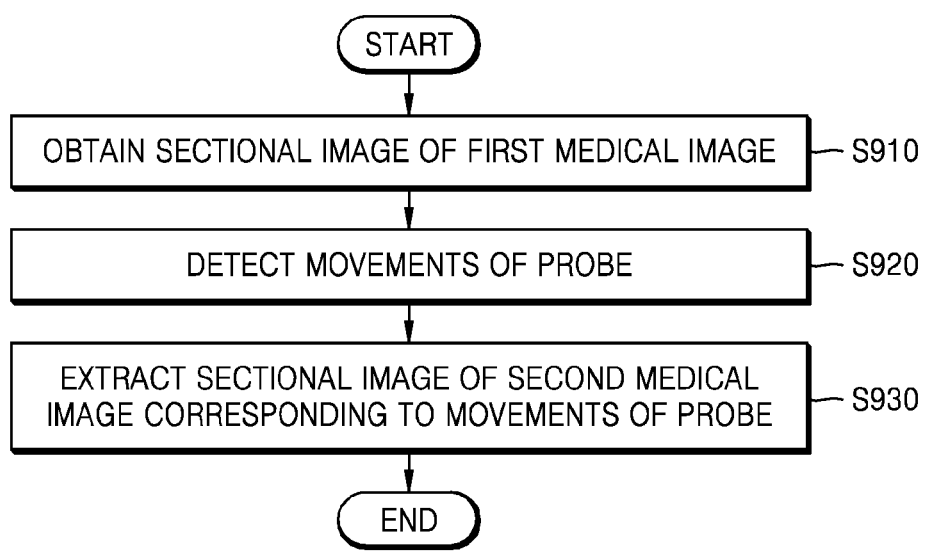
FIG. 9 is a flowchart of a method of obtaining a sectional image of a second medical image corresponding to a sectional image of a first medical image, according to an exemplary embodiment.

The sectional image of the second medical image corresponding to the sectional image of the first medical image may be obtained by using the final transformation relation $T_f$. FIG. 9 is a flowchart of a method of obtaining a sectional image of a second medical image corresponding to a sectional image of a first medical image, according to an exemplary embodiment. Referring to FIG. 9, the first medical apparatus 110 may obtain the sectional image of the first medical image via the probe 111 in real-time (operation S910). When the first medical apparatus 110 is an ultrasonography machine, the first medical apparatus 110 may transmit ultrasound waves on the target by using the probe 111, detect ultrasound echo waves, and thus generate an ultrasound image. The obtained first medical image is transferred to the registering apparatus 140.

The detector 130 may detect movements of the probe 111 (operation S920). When the probe 111 moves, a position and orientation of the ultrasound waves transmitted onto the target and a view of the first medical image may be changed. Since a position and an orientation of the probe 111 correspond one-to-one with the view of the first medical image, the view of the first medical image may be predicted by detecting the movements of the probe 111. Although the obtaining of the first medical image and the detecting of the movements of the probe 111 may be simultaneously performed, the obtaining of the first medical image has been described first for convenience of description.

The registering apparatus 140 may obtain the sectional image of the second medical image corresponding to the movements of the probe 111 from the second medical image (operation S930). The second medical image may be an image that is captured in advance. Also, shapes of an organ and a lesion may be more clearly displayed in the second medical image than the first medical image. The second medical image may be received from the second medical apparatus 120 or a stored image. For example, the second medical image may be a CT image or an MR image. In detail, the detector 130 may detect the probe 111 again when at least one of the position and the orientation of the probe 111 is changed according to at least one of movements or rotations of the probe 111 and may transmit a redetected position and a redetected orientation of the probe 111 to the registering apparatus 140. Since the position and the orientation of the probe 111 correspond one-to-one with the coordinates of the sectional image of the first medical image, as in Equation 3 below, the calculator 543 may use the final transformation relation $T_f$ and transform redetected coordinates $x_{US,1}$ of the sectional image of the first medical image into coordinates $x_{MR,1}$ based on the coordinate system of the second medical image.

$$x_{MR,t} = T_f x_{US,t} \quad \text{[Equation 3]}$$

The third obtainer 544 may obtain a sectional image having transformed coordinates from the second medical image. The sectional image of the first medical image and the sectional image of the second medical image corresponding thereto may have the same view with respect to the target. The sectional image of the first medical image and the sectional image of the second medical image corresponding thereto may be displayed to the outside via the user I/F 530 or the display apparatus 150. The sectional image of the first medical image and the sectional image of the second medical image corresponding thereto may be displayed such that images are in different areas of a single screen or overlap in a single area.

As described above, since the transformation relation between the respective coordinate systems of the first and second medical images is calculated by using the reference point, the registration process may be more simply performed than when registering a plurality of images having different modalities at a random initial location and image registration errors may be reduced. In addition, since the transformation relation is supplemented by using other objects, the transformation relation may be more precisely obtained.

The method of registering the medical images can also be implemented through computer-readable code and/or instructions on a medium, e.g., a computer-readable medium, to control at least one processing element to implement any above-described exemplary embodiment. The medium can correspond to any medium/media permitting the storage and/or transmission of the computer-readable code. The computer-readable code can be recorded and/or transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream, according to one or more exemplary embodiments. The media may also be a distributed network, so that the computer-readable code is stored/transferred and executed in a distributed fashion. Furthermore, the processing element could include a processor or a computer processor, and processing elements may be distributed and/or included in a single device.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of registering medical images, the method comprising:
    determining whether a probe is disposed on a reference point of a target, the reference point being a physiological feature in the target that is not modified over time;
    calculating, when the probe is disposed on the reference point, a transformation relation between a first medical image and a second medical image of a different modality than that of the first medical image, by calculating the transformation relation between coordinates of the reference point based on a coordinate system of the first medical image and coordinates of the reference point based on a coordinate system of the second medical image, wherein the first medical image is obtained by using the probe;
    supplementing the transformation relation by aligning a first object included in the first medical image and a second object included in the second medical image; and
    obtaining, from the second medical image, a sectional image corresponding to a sectional image of the first medical image, by using the transformation relation which has been supplemented,
    wherein, in response to the first object and the second object being different, the transformation relation is supplemented by matching a geometric disposition structure between the first object and the second object with a pre-stored geometric disposition structure,
    wherein the obtaining comprises:
        obtaining coordinates of the sectional image of the first medical image,
        transforming the coordinates of the sectional image of the first medical image into coordinates of the second medical image by using a function of the transformation relation, and
        obtaining, from the second medical image, the sectional image having the transformed coordinates.

2. The method of claim 1, wherein the physiological feature is a bone.

3. The method of claim 1, wherein, when the first object and the second object are the same, the first object and the second object are matched.

4. The method of claim 1, wherein, when the probe is disposed on the reference point of the target, an axis of the probe is parallel to an axis of the target.

5. The method of claim 4, wherein the axis of the target is parallel to a coordinate axis of the second medical image.

6. The method of claim 1, wherein the coordinates of the sectional image of the first medical image correspond to a position and an orientation of the probe.

7. The method of claim 1, wherein the first medical image is captured in real-time and the second medical image is captured in advance.

8. The method of claim 1, wherein the first medical image is one among an ultrasound image and an optical coherence tomography image, and
    the second medical image is one among a magnetic resonance image, a computed tomography image, a positron emission tomography image, a single photon emission computed tomography image, and an X-ray image.

9. The method of claim 1, further comprising:
    displaying the sectional image of the second medical image together with the sectional image of the first medical image.

10. A non-transitory computer-readable recording medium having recorded thereon a program, which, when executed by a computer, causes the computer to perform the method of claim 1.

11. A medical image apparatus comprising:
    an interface which receives at least one among a position and an orientation of a probe used to obtain a first medical image; and
    a processor which determines whether the probe is disposed on a reference point of a target, the reference point being a physiological feature in the target that is not modified over time, calculates, when the probe is disposed on the reference point, a transformation relation for registering the first medical image and a second medical image having a different modality from the first medical image based on the reference point by calculating the transformation relation between coordinates of the reference point based on a coordinate system of the first medical image and coordinates of the reference point based on a coordinate system of the second medical image, supplements the transformation relation by aligning a first object included in the first medical image and a second object included in the second medical image, and obtains, from the second medical image, a sectional image corresponding to a sectional image of the first medical image, by using the transformation relation which has been supplemented, wherein, in response to the first object and the second object being different, the transformation relation is supplemented by matching a geometric disposition structure between the first object and the second object with a pre-stored geometric disposition structure, and wherein the processor obtains, from the second medical image, the sectional image corresponding to the sectional image of the first medical image, by:

obtaining coordinates of the sectional image of the first medical image, transforming the coordinates of the sectional image of the first medical image into coordinates of the second medical image by using a function of the transformation relation, and obtaining, from the second medical image, the sectional image having the transformed coordinates.

12. The medical image apparatus of claim 11, wherein, when the probe is disposed on the reference point of the target, an axis of the probe is parallel to an axis of the target.

13. The medical image apparatus of claim 11, further comprising:

a detector which detects the at least one among the position and the orientation of the probe.

* * * * *